United States Patent
Broom et al.

(10) Patent No.: US 10,541,894 B2
(45) Date of Patent: Jan. 21, 2020

(54) METHOD FOR ASSESSING THE PERCEIVED QUALITY OF ADAPTIVE VIDEO STREAMING

(71) Applicant: NetScout Systems, Inc, Westford, MA (US)

(72) Inventors: Simon Broom, Ipswich (GB); Xiao-Si Wang, Ipswich (GB); James Schofield, Sowerby Bridge (GB)

(73) Assignee: Netscout Systems, Inc., Westford, MA (US)

( * ) Notice: Subject to any disclaimer, the term of this patent is extended or adjusted under 35 U.S.C. 154(b) by 198 days.

(21) Appl. No.: 15/411,729

(22) Filed: Jan. 20, 2017

(65) Prior Publication Data
US 2018/0115475 A1   Apr. 26, 2018

Related U.S. Application Data (60) Provisional application No. 62/410,717, filed on Oct. 20, 2016.

(51) Int. Cl.
| | |
|---|---|
| G06F 15/173 | (2006.01) |
| H04L 12/26 | (2006.01) |
| H04L 29/06 | (2006.01) |
| G06F 15/16 | (2006.01) |

(52) U.S. Cl.
CPC .......... *H04L 43/08* (2013.01); *H04L 65/4069* (2013.01); *H04L 65/60* (2013.01)

(58) Field of Classification Search
CPC ...... H04L 43/08; H04L 65/4069; H04L 65/60
USPC ........................................................ 709/231
See application file for complete search history.

(56) References Cited

U.S. PATENT DOCUMENTS

| | | | |
|---|---|---|---|
| 7,406,419 | B2 | 7/2008 | Malfait |
| 2012/0051299 | A1* | 3/2012 | Thakolsri ............. H04W 28/22 370/329 |
| 2012/0117225 | A1 | 5/2012 | Kordasiewicz et al. |
| 2013/0083203 | A1 | 4/2013 | Barrett et al. |
| 2013/0318253 | A1 | 11/2013 | Kordasiewicz et al. |

(Continued)

FOREIGN PATENT DOCUMENTS

EP        2706752 A1    3/2014

OTHER PUBLICATIONS

Extended European Search Report for European Patent Application No. 17197509.7, dated Feb. 18, 2013.

(Continued)

*Primary Examiner* — Karen C Tang
(74) *Attorney, Agent, or Firm* — Locke Lord LLP; Scott D. Wofsy; Christopher J. Capelli (57) ABSTRACT

A method for assessing perceived quality of adaptive media streaming includes receiving, by a device including a processor, a stream of adaptive media content. This stream includes both audio signals and video signals. A number of quality change events in the received stream for a predetermined period of time is determined. Also, a difference value between a highest quality level value detected in the received stream for the predetermined period of time and a lowest quality level value detected in the received stream for the predetermined period of time is determined. A quality impact score value is generated for the received stream based on the determined number of quality change events and based on the determined quality level difference value.

11 Claims, 5 Drawing Sheets

(56) References Cited

U.S. PATENT DOCUMENTS

2015/0026309 A1* 1/2015 Radcliffe .............. H04L 65/602
 709/219
2017/0280162 A1* 9/2017 Zhao ................... H04N 19/159

OTHER PUBLICATIONS

Jorgen, Gustafsson, Ericsson Research et al: Draft Recommendation P.120X;TDH, ITU-T Draft ; Study Period 2013-2016, International Telecommunication Union, Geneva ; CH, vol. 14/12, Oct. 19, 2016 (Oct. 19, 2016), pp. 1-15, XP044186256, Retrieved from the Internet: URL:https://www.itu.int/ifa/t/2013/sg12/exchange/wp2/q14/PNATS_Recommendation/Drafts/Oldversions/P.120Xv0.12.docx.

Jorgen: "Draft Recommendation P.NATS-Pq;TD", ITU-T Draft ; Study Period 2013-2016, International Telecommunication Union, Geneva ; CH, vol. 14/12; Oct. 19, 2016 (Oct. 19, 2016), pp. 1-17, XP044186255, Retrieved from the Internet: URL:https://www.itu.int/ifa/t/2013/sg12/ex change/wp2/q14/PNATS_Recommendation/Drafts /Oldversions/P.120X.3 v0.23.docx.

"3rd Generation Partnership Project; Technical Specification Group Services and System Aspects; Study on improved streaming Quality of Experience (QoE) reporting in 3GPP services and networks (Release 14)", ITU-T Draft ; Study Period 2013-2016, International Telecommunication Union, Geneva ; CH, Sep. 26, 2016 (Sep. 26, 2016), pp. 1-29, XP044180559, Retrieved from the Internet: URL:https://www.itu.int/ifa/t/2013/sg12/docs/170110/td030att-26.909-050.doc.

* cited by examiner

METHOD FOR ASSESSING THE PERCEIVED QUALITY OF ADAPTIVE VIDEO STREAMING

CROSS-REFERENCE TO RELATED APPLICATION

This application claims the benefit of priority under 35 U.S.C. § 119(e) to U.S. Provisional Application No. 62/410,717, filed Oct. 20, 2016, which is incorporated herein by reference in its entirety.

FIELD OF THE INVENTION

Embodiments of the present invention relate to perceptual video quality measurements and, more particularly, to method for assessing the perceived quality of adaptive media streaming.

BACKGROUND OF THE INVENTION

The amount of media content (e.g., video content) available on mobile devices is growing. However, a network often cannot provide constant bandwidth to a mobile device to play the media content over the network. As network speed and/or available bandwidth from a network vary, the quality of video content received on a mobile device can be reduced. One solution is to implement adaptive bitrate (ABR) streaming which can be implemented to deliver different quality media content to a wide range of devices based on available network connections and available bandwidth (e.g., the quality of video provided to a mobile device can be varied based on the available bandwidth of a network). For example, a lower bitrate and lower video quality can be presented to a mobile device in cases where a network connection offers low bandwidth or when network bandwidth drops. In situations where the network becomes congested during playback the bandwidth of the stream can be reduced to deliver lower quality video but to maintain the playout of the stream and mitigate any buffering of the stream which pauses play-out to the user. Higher quality video can be resumed once network congestion has eased. Similarly, a higher bitrate and higher video quality can be presented to a mobile device for higher available network bandwidth.

In order to ensure a high degree of satisfaction for the user of video services such as adaptive video streaming, the perceived video quality of those services needs to be estimated. It is a major responsibility of the broadcast provider towards both content provider and customer to maintain the quality of its service. In all of the cases described above the perceived quality of the video stream viewed by the user will be impacted and it is important for the broadcast providers to understand this impact on quality of experience metrics to be able to manage the network in order to provide the best possible experience to the end consumer. The quality of experience provided may be particularly important for paid services (e.g., whether paid via end consumer subscriptions or the like, or through advertising associated with the distributed media). When using ABR streaming because the actual quality adaptations may occur over longer periods of time (several minutes long rather than several seconds) it is much more difficult to understand the impact on overall quality. Combined with this is the impact of re-buffering events that can transpire when network congestion occurs and before adaptation to a tolerable lower quality stream has been completed. Taking into account all of these subjective factors to predict the overall perception of the end-user is currently difficult because of the limited subjective data available in this new area of video streaming.

Common video quality monitoring models, such as the ITU-T Recommendations P.1201 and P.1202 models do not take into account the aforementioned quality adaptation events. The ITU-T P.1201 model operates by analyzing packet header information as available from respective packet trace data, while the ITU-T P.1202 models exploit further bit stream information, such as coding-related information. Thus, to ensure end consumer satisfaction, the broadcasters of ABR streaming typically need to proactively monitor the combined quality of experience metrics which can accurately reflect the overall user experience.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for assessing perceived quality of adaptive media streaming includes receiving, by a device including a processor, a stream of adaptive media content. This stream includes both audio signals and video signals. A number of quality change events in the received stream for a predetermined period of time is determined. Also, a difference value between a highest quality level value detected in the received stream for the predetermined period of time and a lowest quality level value detected in the received stream for the predetermined period of time is determined. A quality impact score value is generated for the received stream based on the determined number of quality change events and based on the determined quality level difference value.

In another aspect, a computer program product for assessing perceived quality of adaptive media streaming is provided. The computer program product comprises one or more computer-readable storage devices and a plurality of program instructions stored on at least one of the one or more computer-readable storage devices. The plurality of program instructions includes program instructions to receive a stream of adaptive media content including audio signals and video signals and program instructions to determine a number of quality change events in the received stream for a predetermined period of time. The plurality of program instructions also includes program instructions to determine a difference value between a highest quality level value detected in the received stream for the predetermined period of time and a lowest quality level value detected in the received stream for the predetermined period of time and includes program instructions to generate a first quality impact score value for the received stream based on the determined number of quality change events and based on the determined quality level difference value.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

Media distribution over data networks, such as local area networks, wide area networks, the Internet, and the like, have greatly increased the ease with which media content, such as video content, can be shared between users and distributed or broadcast to end consumers of the media content. For example, video media content such as movies, television content, as well as other video content, may be easily distributed to viewers utilizing adaptively streaming video over a content delivery network. While the description herein may generally relate to video media, it will be appreciated that the features and aspects described herein may, in many embodiments, be equally applicable to other media types, including, but not limited to, audio media.

Figure 1:
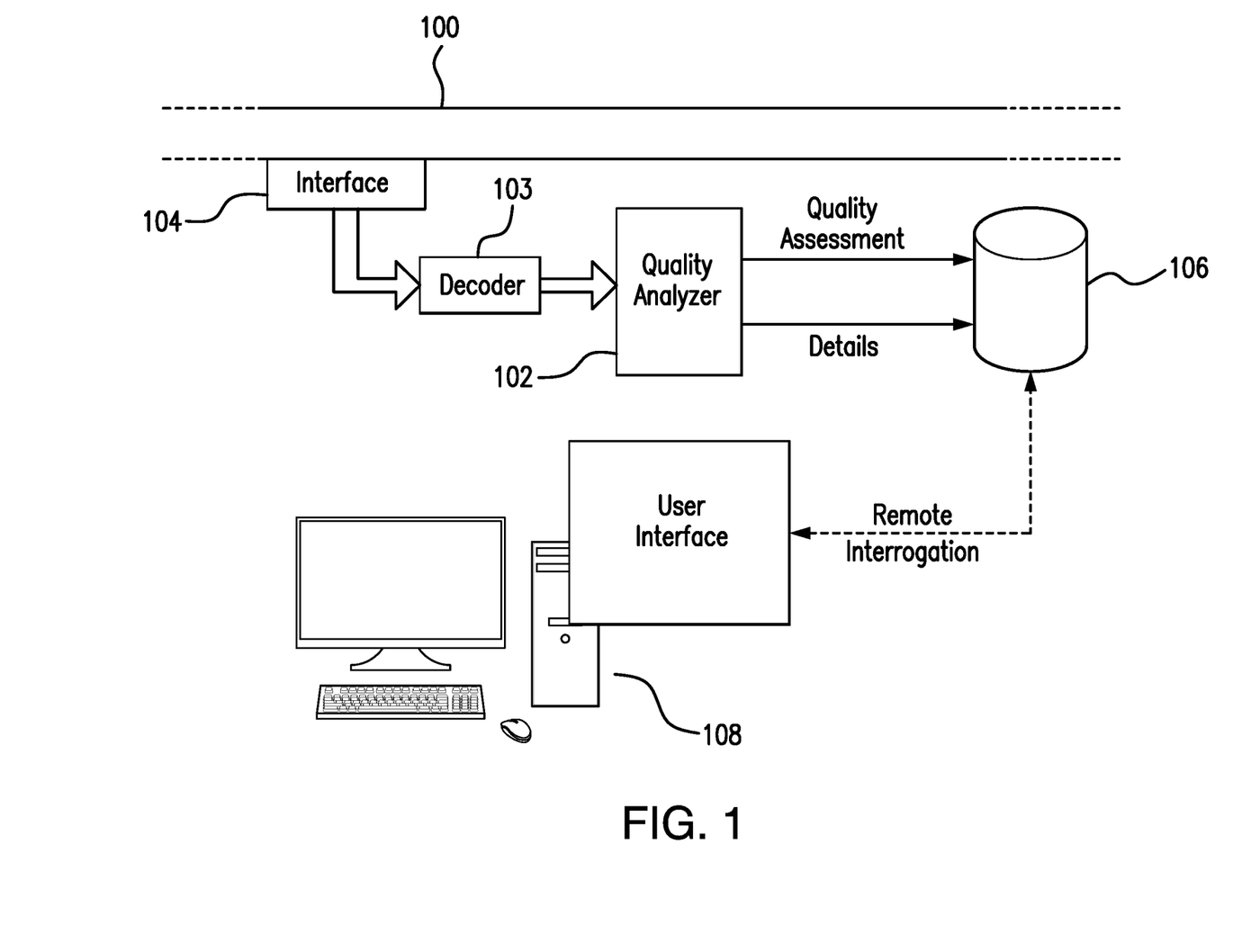
FIG. 1 is a schematic illustration of a non-intrusive quality assessment system in accordance with embodiments of the present invention.

Referring to FIG. 1 of the drawings, there is shown a non-intrusive quality analyzing system 102 which is connected to a communications channel 100 via an interface 104. The interface 104 may provide any data conversion required between the monitored data and the quality analyzing system 102. A data signal is analyzed by the quality analyzing system 102, as will be described later and the resulting quality assessment is stored in a database 106. Details relating to data signals which have been analyzed may also be stored for later reference. Further data signals are periodically analyzed and the quality assessment is periodically updated so that over a period of time the quality assessment relates to a plurality of analyzed data signals.

The database 106 may store quality assessment results resulting from a plurality of different intercept points. The database 106 may be remotely interrogated by a user via a user terminal 108, which provides a user interface configured and operable to present quality assessment results stored in the database 106.

Figure 2:
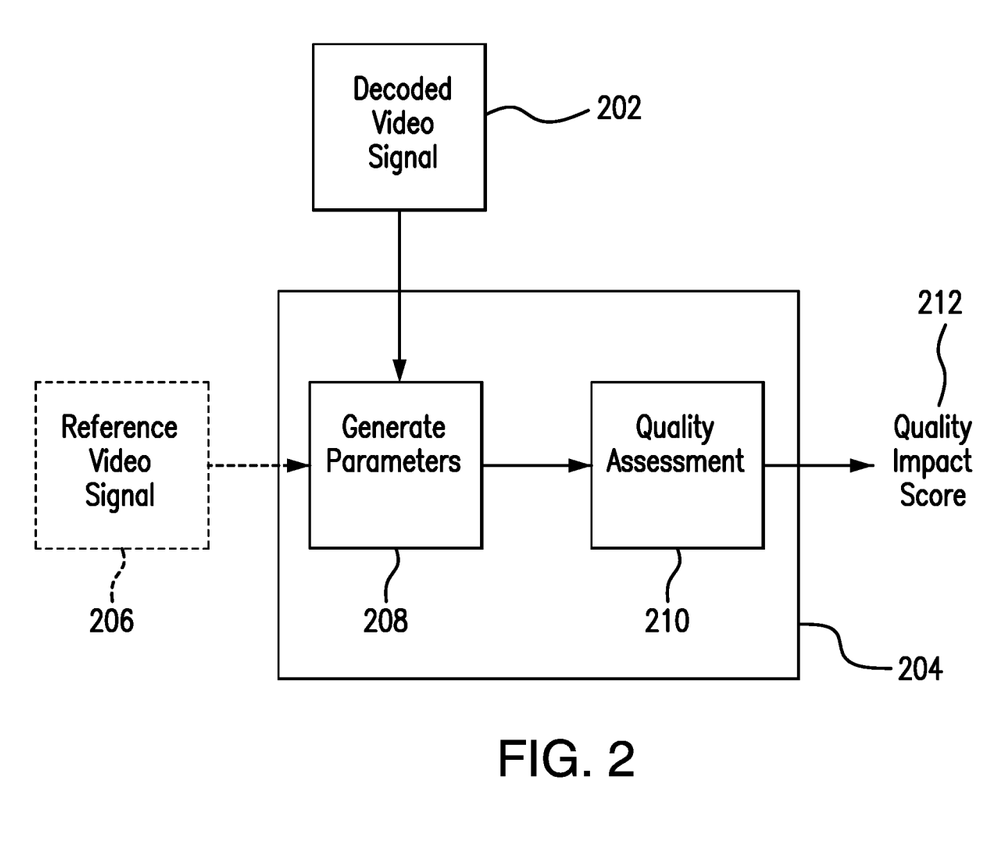
FIG. 2 is a block diagram illustrating functional block of an apparatus for quality assessment in accordance with an illustrative embodiment of the present invention.

Referring now to FIG. 2, an original (reference) video signal 206 is encoded and transmitted via a telecommunications channel. At least in some embodiments, the quality analyzing system 102 may comprise a full-reference system. In a full-reference system, it is assumed that reference video signal 206 and decoded video signal or packet stream 202 are spatially and temporally aligned prior to comparison of the reference video signal 206 and the decoded video signal 202. In a full-reference system parameters are generated by parameter generation module 208 based on a comparison of the decoded video signal 202 and the reference video signal 206. In a no-reference system parameters are generated by the parameter generation module 208 based on the decoded video signal 202 and some additional information from the received packet stream. Parameters are then used by quality assessment module 210 to generate a mean opinion score (MOS).

It should be noted that quality assessment models typically produce a set of intermediate parameters from the input signal (or signals in the case of a full-reference model) such that each parameter changes in response to the presence and severity of one or more classes of image impairment. Said intermediate parameters are then combined to produce a single quality assessment value, namely, a quality impact score 212, that correlates with the mean opinion score (MOS), among other quality factors, that would be obtained for the decoded input signal when assessed by human subjects in a subjective experiment. An example of a video quality assessment model that uses an intermediate set of parameters as described above is provided in Annex A of ITU-T Recommendation J.144, "Objective perceptual video quality measurement techniques for digital cable television in the presence of a full reference", with the weighted sum of the parameters performed according to Equation A.4-2. ITU-R Recommendation BT-500, "Methodology for the subjective assessment of the quality of television pictures" describes methods of performing subjective experiments for video signals.

Various embodiments of the present invention contemplate that video content will be delivered to various end-user devices via a streaming communications protocol. Examples of different streaming protocols are: HTTP Live Streaming (HLS), IP Multicast, Microsoft Smooth Streaming, MPEG-DASH, Adobe HTTP Dynamic Streaming, and the like.

Figure 3:
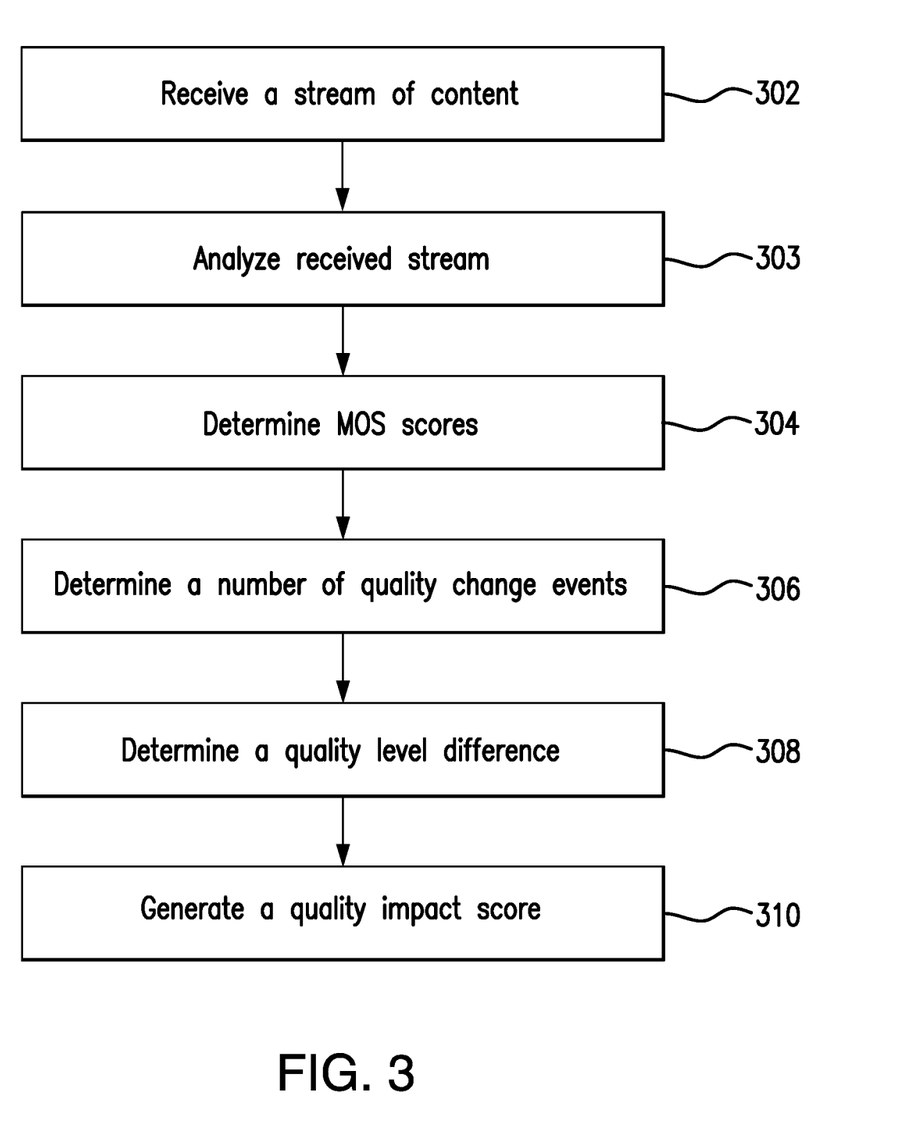
FIG. 3 is a flowchart of operational steps carried out by the quality assessment system of FIG. 1, in accordance with an illustrative embodiment of the present invention.

FIG. 3 is a flowchart of operational steps of the quality analyzing system 102 of FIG. 1, in accordance with exemplary embodiments of the present invention. Before turning to description of FIG. 3, it is noted that the flow diagram shown therein is described, by way of example, with reference to components shown in FIGS. 1-2 and 4, although these operational steps may be carried out in any system and are not limited to the scenario shown in the aforementioned figure. Additionally, the flow diagram in FIG. 3 illustrates an example in which operational steps are carried out in a particular order, as indicated by the lines connecting the blocks, but the various steps shown in this diagram can be performed in any combination or sub-combination. It should be appreciated that in some embodiments some of the steps described below may be combined into a single step. In some embodiments, one or more additional steps may be included.

The quality analyzing system 102 may generally be a software application comprising one or more modules that assesses quality of end-to-end streaming media sessions transmitted via the communications channel 100. At 302, the quality analyzing system 102 preferably receives an incoming audio-video (AV) stream through the interface 104. In some embodiments, the interface 104 may include an AV probe (not shown in FIG. 1). The AV probe may be configured for receiving an incoming AV stream at a sampling rate equal to approximately one second. The AV probe may also be configured to transmit the captured AV stream to a decoder 103 substantially in real-time.

Next, at step 303, the decoder 103 optionally performs at least partial decoding of the received video on selected frames and/or slices to improve accuracy of quality estimates. Decoding of the selected frames and/or slices, as well as selection thereof, is based, for example, on the Transport Stream (TS) layer information and/or elementary stream (ES) layer information. In one embodiment, partial decoding includes decoding one or more sets of I-slices contained in the video sequence. In the H.264 video compression standard, such I-slices are coded without reference to any other slices except themselves and contain only intra-coded macroblocks. Decoding only I-slices for subsequent quality analysis is computationally much less expensive compared to decoding the complete frames or video sequence for two reasons. First, only a portion of the video is actually decoded, and second, the portions selected for decoding, i.e., the I-slices, can be decoded relatively quickly.

According to an embodiment of the present invention, the quality analyzing system 102 analyzes the decoded video 202 to calculate video content metrics. Video content metrics are quantified measurements of video impairments and are produced by means of algorithms known in the art and/or readily devised by one of skill in the art.

In step 304, the quality assessment module 210 calculates an estimate of mean opinion score (MOS) for the decoded video stream. The algorithm for generating video MOS incorporates the aforementioned video content metrics. In one embodiment, vision modeling, which deals with the complexity of user perception, may be incorporated into the weighting scheme of the MOS algorithm. In this way, video impairments can be scaled according to human vision metrics to better reflect the visual perception of the end user. The use of a MOS to quantify video quality based on metric generated from the received stream (of packets) in conjunction with adaptivity changes information described below provides a number of advantages over methods known in the art.

According to an embodiment of the present invention, the quality assessment module 210 may utilize one or more perceptual models. Perceptual models may be considered to be a subset of objective video quality models. Whereas an objective video quality model can refer to any automated quality assessment method, a perceptual model attempts to determine to what extent any quality changes would be perceived by a viewer. Perceptual models can utilize the pixel information in the decoded video sequence, and in the case of full-reference models the reference signal may also be used to predict the degradation of the processed video.

Figure 4:
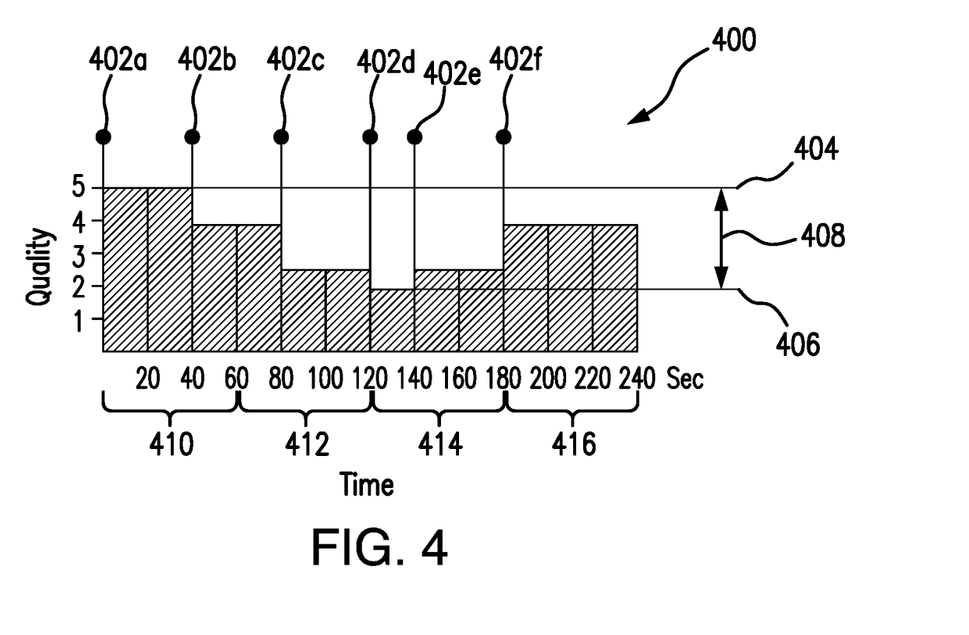
FIG. 4 is a histogram illustrating quality changes over time for a stream of content, in accordance with an illustrative embodiment of the present invention.

FIG. 4 is a histogram illustrating quality changes over time for a stream of content. The quality change events are marked with circles 402*a-f* on the histogram 400. The quality change events 402 represent the events where the encoded picture quality suddenly drops or rises (either after a scene cut or in the middle of a scene) and can be identified by detecting when a corresponding quality parameter is decreased/increased between an inter-picture and an intra-picture without increasing/decreasing considerably after that.

Intra-picture flicker is just one example of an abrupt change in quality parameter causing a quality change event in an encoded video sequence. FIG. 4 illustrates four types of abrupt changes in quality parameter: a peak 402*a*; a trough 402*d*, a step up 402*e-f*; and a step down 402*b-c*. A trough is equivalent to a step down immediately followed by a step up.

According to an embodiment of the present invention, in step 306, the quality assessment module 210 may process the obtained stream to determine how many quality change events had occurred over a predetermined assessment period. Quality change events are changes in the adaptive stream quality that may be perceptible to a viewer of the stream, and may be based on multiple significant changes in the video/audio signal, on a high rate of changes in the video/audio signal or on a ramp in the audio/video signal, as described herein. As described in greater detail above, the quality parameter (MOS score) may be calculated separately for video and for audio, for example every second, or as an overall media MOS score for both video and audio. This quality parameter can then be used by the quality assessment module 210 to identify adaptivity changes.

In the example of FIG. 4, one quality change event 402*b* is detected at t=40 seconds, with a corresponding quality parameter (MOS score) changing value from 5 to 4. After that, even though the quality remains at a relatively consistent level, with any changes in quality parameter remaining below a predetermined threshold, for most of the next 40 sec time interval, another perceptible quality change event 402*c* can nevertheless be detected at t=80 seconds, again with a corresponding quality parameter changing from 4 to 3.

The general concepts of assessing the perceived quality of adaptive video streaming based upon observed number of change events may be supplemented with other factors as desired. For example, in one embodiment, the rate of changes (independent of stream length) may be used in conjunction with the actual number of change events, for instance, to make more accurate quality assessment. It may also be desirable to limit the total number of quality changes and/or the rate of changes to identified changes exceeding a pre-defined threshold, so that the effects of such changes can be monitored.

Continuing with the example of FIG. 4, the rate of quality changes for the first three minutes 410-414 remains substantially constant and is equal to 5 (due to detected events 402*b-f*, respectively), while during fourth minute 416 the rate of quality changes is equal to zero.

Referring back to FIG. 3, in step 308, the quality assessment module 210 may process the obtained stream to determine a quality level difference corresponding to a predetermined assessment period. According to some embodiments, the quality assessment module 210 may process quality information to identify the following two attributes: minimum quality, which specifies a minimum quality value for all detected perceivable quality change events in an assessment period; and maximum quality, which specifies a maximum quality value for all detected perceivable quality change events in an assessment period. These attributes contain values that quantify the highest and lowest quality levels over a specified timeline (e.g., a specified duration of the adaptive stream content) that may correspond to a period, segment, or sub-segment. In some embodiments, these values may indicate a long-term (or average) minimum and maximum quality measures over the entire duration of the stream. In another embodiment, vectorized sets of quality values may be provided to specify the minimum and maximum quality levels for the assessment periods across different segments and sub-segments. Once both maximum quality and minimum quality values are identified, the quality assessment module 210 determines the difference by subtracting the minimum quality from the maximum quality value.

In the example of FIG. 4, the maximum quality level 404 is equal to 5 while the minimum quality level 406 is equal to 2. Thus, in this example, the quality assessment module 210 determines the quality difference value 408 to be equal to 3. This quality difference value 408 may quantify the quality level over a specified time period, which is equal to four minutes in the example of FIG. 4. In some embodiments, this value may indicate a long-term (or average) quality measure over the entire duration of the adaptive stream. The quality difference value 408 may be calculated separately for video and for audio or as an overall quality difference value for both video and audio. In another embodiment, vectorized sets of quality values may be provided specifying quality levels across different audio/video segments and sub-segments of the received stream.

Another factor of the perceived quality of adaptive video streaming may include a total quality change value. This metric may be a sum of all of the quality changes (MOS score differences) during the specified assessment period. By using the total quality change value the quality assessment module 210 considers both fluctuations as well as absolute changes in determined quality values.

Referring back to FIG. 3 yet again, in step 310, the quality assessment module 210 may generate a quality impact score for the received stream responsive to the determined number of quality change events (in step 306) and the determined quality difference value (in step 308). The quality assessment module 210 may establish a relationship between a current value of the quality impact score and a threshold value and may monitor the relationship as being indicative of a degradation of the quality of the received adaptive stream, and may selectively initiate a mitigating response.

In one embodiment, the quality assessment module 210 may use the following formula (1) to generate the quality impact score:

$$\text{Quality Impact Score} = a_1 * \text{NumberofQualityChanges} + a_2 * \text{MaxQualityDifference} + a_3 * \text{NumberofQualityChanges} * \text{MaxQualityDifference} \quad (1),$$

where NumberofQualityChanges represents a number of detected quality of change events 402, MaxQualityDifference represents the quality difference value 408 and where $a_1$, $a_2$ and $a_3$ are scoring factors. In at least one embodiment, there are two types of statistical factors that contribute to this score. The first type is positive scoring factors, which contribute to positively score certain quality metrics. The second type is negative scoring factors, which diminish contribution of certain quality metrics to the overall quality impact score. In other words, formula (1) represents a simple weighted sum. The quality assessment module 210 can now assess the perceived quality for each predefined assessment period. In particular, preferably an expected value of the quality impact score for a time period is determined by plugging the values determined in steps 306 and 308 into the formula (1). As an example, using the quality information determined based on the histogram 400 in FIG. 4, if the quality assessment module 210 needs to generate the quality impact score, then $$\text{QualityImpactScore} = 6*a_1 + 3*a_2 + 18*a_3$$

It should be noted that $a_1$, $a_2$ and $a_3$ are numerical weights (scoring factors) that can be derived from subjective data in one embodiment. For example, the generated overall quality impact score may include at least one quality factor having a weighted score, where the weighted score of the at least one factor is determined by at least an importance assigned to the at least one factor by the user based on the subjective data. Scores of each factor may be weighted in any manner, for example by applying a higher weight to quality factors having a greater importance to the user.

Methods for optimizing the relative weights of the determined quality factors, like multi-variable regression, are well known to those skilled in the art and are not directly relevant to the embodiments of the present invention. One of skill in the art can devise an appropriate weighting scheme between the determined quality factors to accommodate a given video quality assessment scenario. Furthermore, these weights may be periodically changed if user-specified importance changes over time. In such scenario, the aforementioned quality impact score may be regenerated by the quality assessment module 210 using the changed numerical weights. Finally, if two or more quality impact scores are generated by the quality assessment module 210 for the same assessment period, the quality assessment module 210 may determine an average of these scores, which may be even more accurate quality indicator for an adaptive media stream.

Thus, the use of quality adaptation events in step 310 provides more accurate and more easily generated overall quality metric, i.e., quality impact score, when applied to the decoded stream of content from step 302.

In summary, various embodiments of the present invention describe a novel adaptive media stream monitoring approach that offers a cost-effective and service agnostic video stream monitoring solution capable of combining and correlating the streaming video service performance adaptation factors to generate an overall quality impact score without adding a significant overhead. Adaptive streaming has several associated factors that may need to be considered. For example, adaptive streaming playback may be more computationally complex for the client player. A number of operating points may need to be encoded and stored on the server. Adaptive streaming protocols may conflict with other protocol layers, such as TCP. Finally, adaptive streaming may tend to be reactive in nature, because clients may only become aware of network congestion after the fact. This may result in a high degree of visual quality variation during a media streaming session. Advantageously, in a preferred embodiment, the quality assessment module 210 analyzes and correlates factors such as, but not limited to, overall audio quality, overall video quality, recency and adaptivity effects that degrade the quality and that are associated with a particular adaptive video streaming session. Various embodiments of the present invention introduce a new approach aimed at utilizing actually perceived quality change events (either total number of quality changes or rate of quality changes or both) and the quality level difference value corresponding to a predetermined assessment period, which is enabled to proactively ensure that a given adaptive media stream is fully functional and operational across all stages of end-to-end content delivery to the end users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
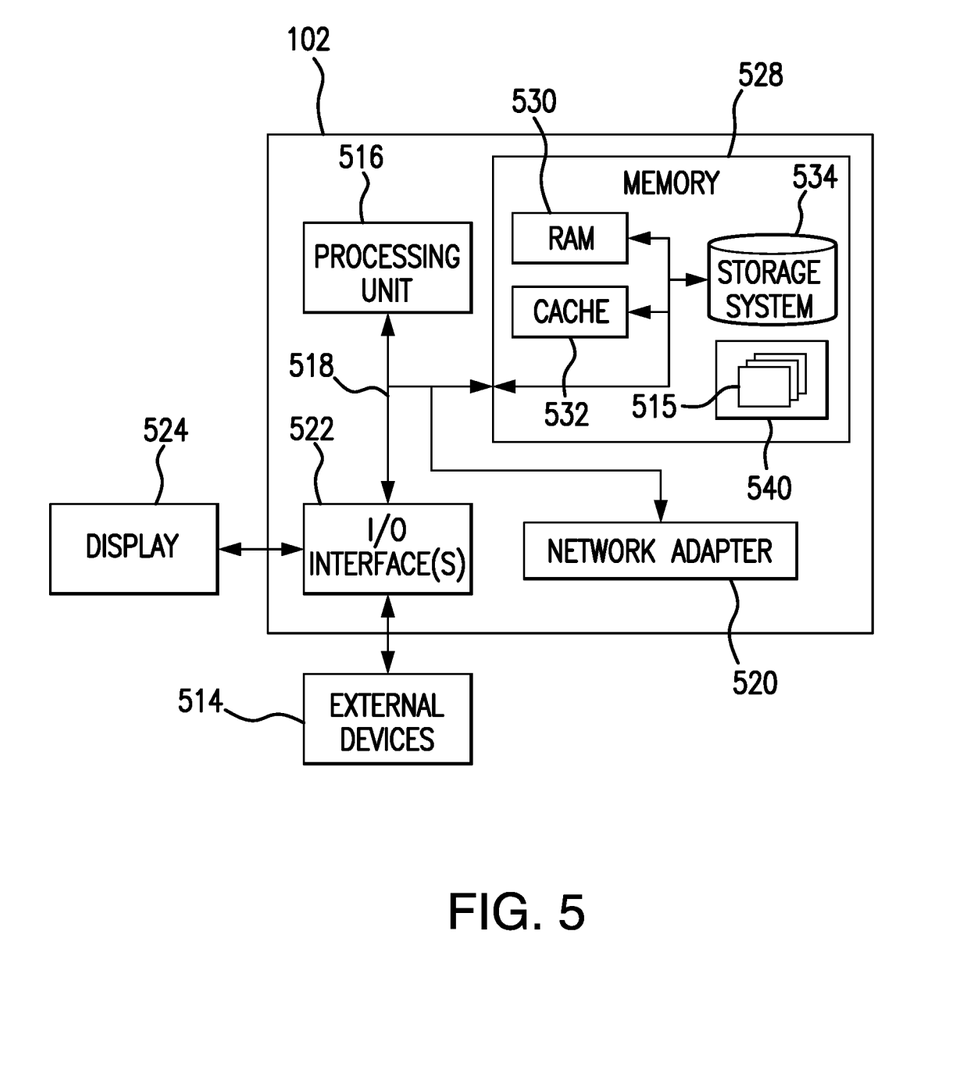
FIG. 5 illustrates internal and external components of a quality analyzer device in accordance with illustrative embodiments of the present invention.

Embodiments of adaptive streaming media session monitoring framework may be implemented or executed by a centralized non-intrusive quality analyzing system comprising one or more computer servers. One such quality analyzing system 102 is illustrated in FIG. 5. In various embodiments, quality analyzing system 102 may be a server, a mainframe computer system, a workstation, a network computer, a desktop computer, a laptop, or the like.

Quality analyzing system 102 is only one example of a suitable system and is not intended to suggest any limitation as to the scope of use or functionality of embodiments of the invention described herein. Regardless, quality analyzing system 102 is capable of being implemented and/or performing any of the functionality set forth hereinabove.

Quality analyzing system 102 may be described in the general context of computer system-executable instructions, such as program modules, being executed by a computer system. Generally, program modules may include routines, programs, objects, components, logic, data structures, and so on that perform particular tasks or implement particular abstract data types. Quality analyzing system 102 may be practiced in distributed data processing environments where tasks are performed by remote processing devices that are linked through a communications network. In a distributed data processing environment, program modules may be located in both local and remote computer system storage media including memory storage devices.

Quality analyzing system 102 is shown in FIG. 5 in the form of a general-purpose computing device. The components of quality analyzing system 102 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Quality analyzing system 102 typically includes a variety of computer system readable media. Such media may be any available media that is accessible by quality analyzing system 102, and it includes both volatile and non-volatile media, removable and non-removable media.

System memory 528 can include computer system readable media in the form of volatile memory, such as random access memory (RAM) 530 and/or cache memory 532. Quality analyzing system 102 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515, such as quality assessment module 210, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Quality analyzing system 102 may also communicate with one or more external devices 514 such as a keyboard, a pointing device, a display 524, etc.; one or more devices that enable a user to interact with quality analyzing system 102; and/or any devices (e.g., network card, modem, etc.) that enable quality analyzing system 102 to communicate with one or more other computing devices. Such communication can occur via Input/Output (I/O) interfaces 522. Still yet, quality analyzing system 102 can communicate with one or more networks such as a local area network (LAN), a general wide area network (WAN), and/or a public network (e.g., the Internet) via network adapter 520. As depicted, network adapter 520 communicates with the other components of quality analyzing system 102 via bus 518. It should be understood that although not shown, other hardware and/or software components could be used in conjunction with quality analyzing system 102. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network analyzer device for assessing perceived quality of adaptive media streaming in a network, comprising:
   an interface device for coupling to a network;
   a media analyzing device for analyzing adaptive media content received from a network via the interface device configured to analyze one or more sets of packets contained in the received adaptive media content;
   a quality analyzer device having a processor configured to:
   receive, from the media analyzing device, an encoded stream of adaptive media content comprising audio signals and video signals;
   decode the received stream of adaptive media content and determine a number of quality change events in the received decoded stream for a predetermined period of time;
   determine a difference value between a highest quality level value detected in the decoded received stream for the predetermined period of time and a lowest quality level value detected in the decoded received stream for the predetermined period of time; and
   generate a first quality impact score value for the decoded received stream based on the determined number of quality change events and based on the determined quality level difference value, wherein the Quality Impact Score=$a_1$*NumberofQualityChanges+$a_2$*MaxQualityDifference+$a_3$*NumberofQualityChanges*MaxQualityDifference, where NumberofQualityChanges represents a number of detected quality of change events, MaxQualityDifference represents the quality difference value and where a1, a2 and a3 are scoring factors.

2. The network analyzer device as recited in claim 1, wherein the quality analyzer device is further configured to determine a Mean Opinion Score (MOS) value after receiving the stream of adaptive media content.

3. The network analyzer device as recited in claim 1, wherein the number of quality change events, the highest quality level value, the lowest quality level value and the first quality impact score value are associated with the audio signals of the stream of adaptive media content.

4. The network analyzer device as recited in claim 1, wherein the number of quality change events, the highest quality level value, the lowest quality level value and the first quality impact score value are associated with the video signals of the stream of adaptive media content.

5. The network analyzer device as recited in claim 1, wherein the number of quality change events, the highest quality level value, the lowest quality level value and the first quality impact score value are associated with the combined audio and video signals of the stream of adaptive media content.

6. The network analyzer device as recited in claim 1, wherein determining the number of quality change events in the received stream comprises determining a number of quality change events exceeding a predefined threshold relative to the MOS value.

7. The network analyzer device as recited in claim 2, further comprising determining a sum of MOS values corresponding to the number of quality change events to yield a total quality change value, wherein the first quality impact score value for the received stream is determined based on the determined number of quality change events, quality level difference value and based on the determined sum of MOS values corresponding to the number of quality change events.

8. The network analyzer device as recited in claim 1, wherein the first quality impact score value is generated using numerical weight values assigned to the determined number of quality change events and to the determined quality level difference value.

9. The network analyzer device as recited in claim 1, wherein the quality analyzer device is further configured to change the numerical weight values based on changed user-specified importance and generating a second quality impact score for the received stream using the changed numerical weight values.

10. The network analyzer device as recited in claim 1, wherein the quality analyzer device is further configured to determine an impact score average based on the first and second quality impact score values.

11. The network analyzer device as recited in claim 1, wherein the quality analyzer device is further configured to utilize one or more perceptual models for determining the first quality impact score.

* * * * *